United States Patent [19]

Curwen

[11] 4,360,087
[45] Nov. 23, 1982

[54] SUSPENSION AND VIBRATION ISOLATION SYSTEM FOR A LINEAR RECIPROCATING MACHINE

[75] Inventor: Peter Curwen, Ballston Spa, N.Y.

[73] Assignee: Mechanical Technology Incorporated, Latham, N.Y.

[21] Appl. No.: 153,839

[22] Filed: May 27, 1980

[51] Int. Cl.³ .............................................. F16F 7/10
[52] U.S. Cl. .................................. 188/379; 417/363
[58] Field of Search ............... 188/1 B, 378–380; 248/636, 638, 648; 417/416, 363

[56] References Cited

U.S. PATENT DOCUMENTS

| | | | |
|---|---|---|---|
| 2,584,222 | 2/1952 | O'Connor | 188/1 B X |
| 2,850,116 | 9/1958 | Spaetgens | 188/1 B |
| 3,387,499 | 6/1968 | Brüderlien | 188/1 B X |
| 3,667,706 | 6/1972 | Tiberghien | 188/1 B X |
| 3,937,600 | 2/1976 | White | 417/416 |

*Primary Examiner*—Duane A. Reger
*Attorney, Agent, or Firm*—Joseph V. Claeys; Arthur N. Trusch, III

[57] ABSTRACT

A suspension system for a linear reciprocating machine incorporates dynamic vibration isolation means into a mass flow system of the machine. An antiphase mass movement results in an essentially zero transmissibility of machine vibration to an outer casing enclosing the machine.

16 Claims, 5 Drawing Figures

SUSPENSION AND VIBRATION ISOLATION SYSTEM FOR A LINEAR RECIPROCATING MACHINE

FIELD OF THE INVENTION

The present invention relates to vibration isolation systems and in particular to a dynamic vibration isolating suspension system which may be incorporated into a mass flow system of a linear reciprocating machine.

The term vibration refers to a continuing periodic motion of one or more particles or one or more rigid bodies with respect to a specified central reference or static equilibrium position. Rigid body mechanical vibration more particularly refers to the periodic motion of a body having mass which is supported by one or more elastic elements having stiffness (or conversely, resiliency).

Elastic element, as used herein, defines a device which imposes a force on the body tending to restore the body to its static equilibrium position if the body becomes displaced from its equilibrium position. Mass or inertia implies that the velocity imparted to the body during restoration of the static equilibrium position will cause the body to overshoot its equilibrium position. Mechanical vibration is the consequence of the interplay of mass and stiffness resulting in periodic displacement of the mass about its original static equilibrium configuration at the instigation of an exciting force.

The vibration of a solid body in contact with a fluid medium such as air, water, etc., imparts vibrations in the medium. When the rate of vibration of the solid body ranges between 30 and 15,000 hertz, the imparted vibration transmits energy in the form of an acoustic wave, audible to the human ear. As a practical consequence, mechanical vibrations produce undesirable noise, motion and forces.

Vibration isolation generally refers to the means used to reduce the transmittance of vibration of one body to another, or to reduce the transmittance of periodic (dynamic) forces from one body to another. The simplest form of a vibration isolator is a mechanical element or device having low stiffness (or high resilience) and negligible mass.

PRIOR ART

Examples of above-described isolators include springs and rubber blocks. This basic type of vibration isolator has been employed in suspension systems for linear reciprocating machines such as may be found in U.S. Pat. Nos. 3,666,219 and 2,894,678. A mass-elastic diagram generally representing this basic approach to vibration isolation is depicted in FIG. 1A. The transmissibility of such isolation systems is a function of the dynamic stiffness of the isolation device, the inertial mass of the machine or body being supported by the isolation device, and the frequency of the vibratory motion or periodic forces imposed on the inertial mass. The shortcomings of these passive isolation devices include amplified vibration at resonance frequency and high static deflections if acceptably low vibration transmission characteristics are to be achieved at normal operating frequencies. The term transmission here relates specifically to the transmitting of periodic motion or force from one solid body to another. Transmissibility is generally defined as the ratio of the force transmitted by the isolator means to the force applied by the exciting source.

Low transmissibility herein refers to a transmissibility value less than unity which is the desired objective of vibration isolation devices. Unfortunately, it has been substantially difficult to achieve low transmissibility with simple (passive) isolation systems while at the same time providing sufficient static stiffness for acceptable support means. Employed as a support system for a reciprocating machine, isolators of sufficient resiliency to satisfy the machine's dynamic isolation requirements frequently result in high static deflections and may lead to static equilibrium instability problems.

The problem of large (resonant) vibratory displacements at the resonant frequency may be alleviated by use of a damping system in parallel with the isolator such as a spring/dashpot combination as exemplified in U.S. Pat. No. 3,807,678. However, at frequencies above resonance, which is the normal operating frequency range of a properly designed isolation system the damping mechanism increases dynamic force transmissibility.

The present invention employs dynamic vibration isolation to achieve substantially reduced displacement and force transmissibility at typical operating frequencies while maintaining sufficient static stiffness (or rigidity) to support relatively heavy reciprocating machines such as a reciprocating compressor, for example, without unduly large static deflections. A further advantage of the present invention is the ability to substantially reduce displacement and force transmissibility regardless of the vibratory displacements experienced by the supported mass as a consequence of exciting forces acting on the mass. In other words, the static support stiffness of the dynamic isolation system can be high and the vibratory displacements of the supported mass can be large while the resultant dynamic force transmitted to the isolator foundation, such as a floor, for example, will still be very low.

A two-mass vibration isolator is conceptually capable of producing a transmissibility substantially lower than that of a conventional isolator having similar stiffness characteristics. An example of a 2-mass isolator is depicted in FIG. 1B. The 2-mass isolator shown in FIG. 1B is commonly referred to as a vibration absorber isolator. The characteristics of such a 2-mass system differ from the aforementioned simple (passive) isolator inasmuch as the two-mass system has two resonant frequencies. Within a small band of frequencies between the two resonant frequencies and at frequencies above the highest resonance the transmissibility of the two-mass system is smaller than that of simple single-mass isolators of similar stiffness.

The mass elastic model of FIG. 2 illustrates, in its most simplistic form, one embodiment of the isolator of the present invention. In contrast to the prior art 2-mass isolator, the present invention can be designed to yield essentially zero transmissibility at a frequency above the two resonant frequencies of the isolator system while concurrently maintaining substantially reduced transmissibility over a broad range of frequencies above the two resonant frequencies.

In a further embodiment, the present invention achieves substantially reduced transmissibility within a band of frequencies between the two resonant frequencies. In contrast to the isolation systems known in the art which reduce transmissibility only as a consequence of reduced vibratory displacement, the present invention achieves reduced transmissibility virtually irrespective of the vibratory displacements of the body (machine) being isolated.

In U.S. Pat. Nos. 3,091,103 and 3,202,388 the latter being a divisional of the former disclosure, the patentee applies the principles of a two-mass system to provide vibration isolation of periodic motion. As disclosed therein, a fluid vibration isolator has a variable volume bellows which expands and contracts upon applying periodic (vibrational) force. The inertial reaction of a fluid, which flows into (and out of) the bellows, balances the force applied to the body to be isolated. These isolators are designed to transmit constant (i.e. static) force while suppressing periodic (vibratory) forces.

In contrast, the vibration isolator of the present invention utilizes a mass flow conduit system having a prepositioned counterbalance mass to provide high static stiffness and essentially zero transmissibility of vibratory forces at the operating frequency of the machine.

SUMMARY

Briefly stated, the suspension system of the present invention utilizes a particularly adapted conduit system in conjunction with a counter balancing mass to provide a dynamic vibration isolation system for a reciprocating machine having periodic vibratory motion. In-phase and antiphase spring reaction forces are established by the assembly of conduits at operating frequency to produce an essentially zero net resultant force acting upon the points of mounting to an outer casing, foundation or other support means. A low transmissibility of periodic motion and dynamic forces is achieved virtually irrespective of the vibratory displacements of the body or machine being isolated.

DETAILED DESCRIPTION OF THE INVENTION

The present invention provides vibration isolation means for essentially eliminating transmittance of the periodic motion (vibration) and dynamic forces inherent to the operation of the reciprocating machine to the foundation supporting said machine and its casing. The result is a virtual elimination of vibration and an attendant reduction of noise transmitted outside the casing.

Figure 3:
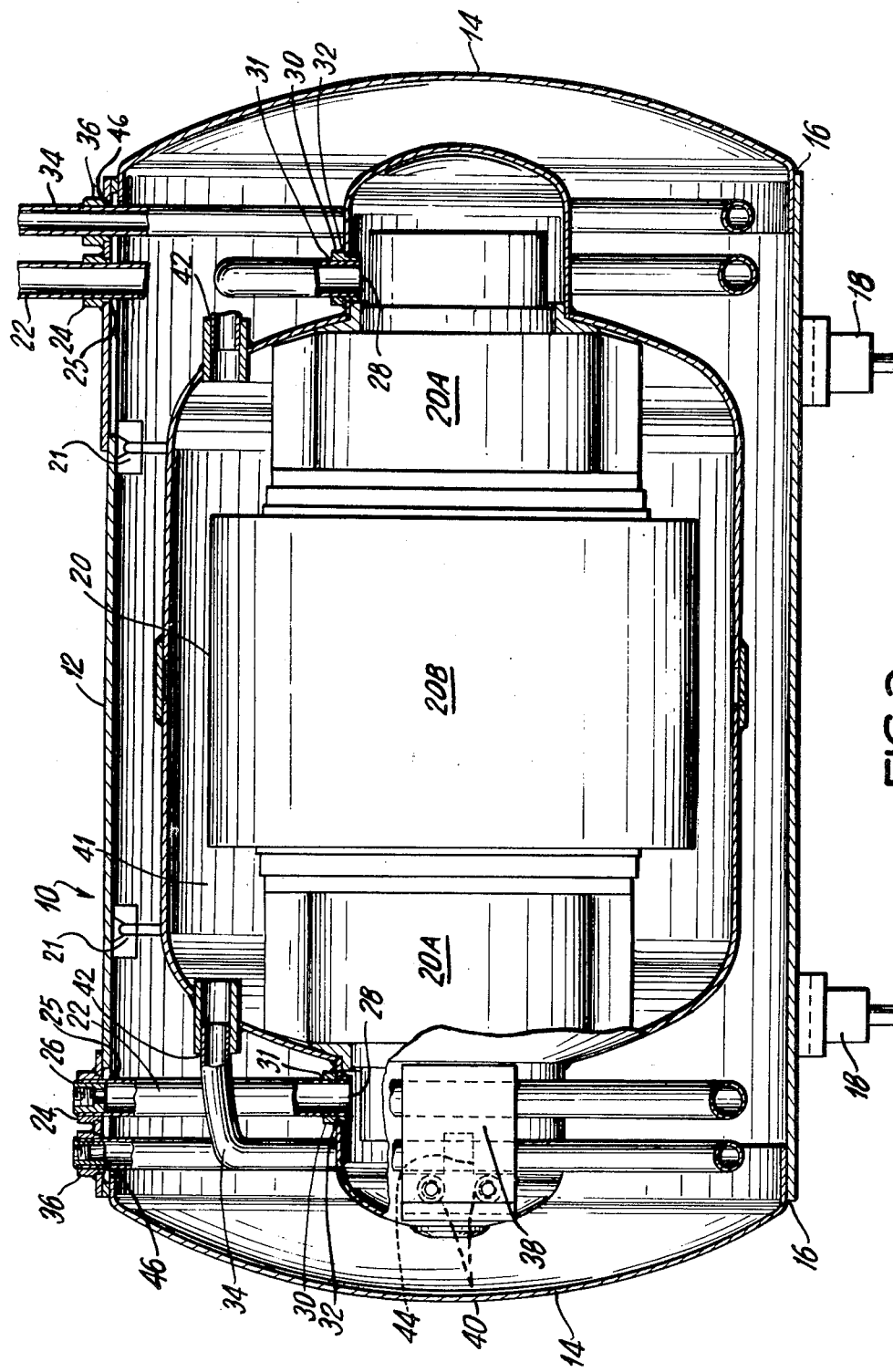
FIG. 3 is a cut-away view in elevation of a compressor employing one embodiment of the invention's suspension system.
Figure 4:
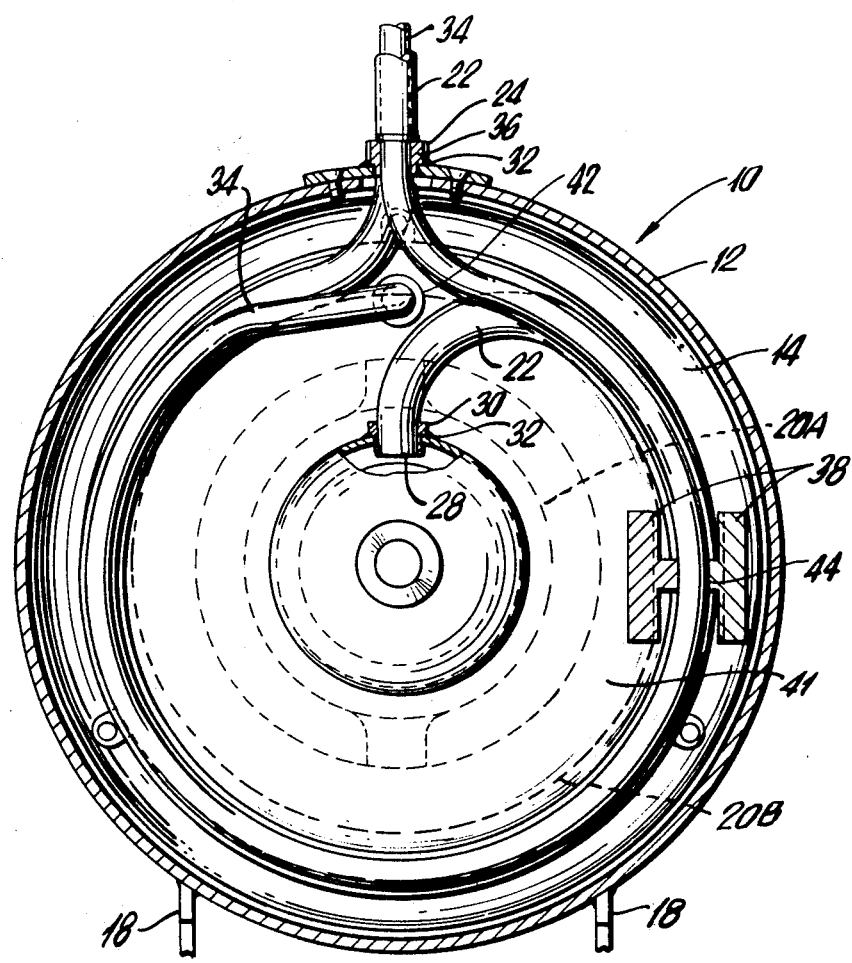
FIG. 4 is a cut-away axial view of the compressor and suspension system of FIG. 3.

As illustrative thereof, in FIGS. 3 and 4, there is shown a linear reciprocating motor driving a compressor having inlet and discharge conduit comprising a part of its mass or fluid flow system. The assembly comprises a metallic outer casing 10 having a generally cylindrical central portion 12 and at least two generally hemispherical end sections 14 engaging said cylindrical portion 12 at 16. Said engaging may be accomplished by conventional means of rigidly affixing end sections 14 to the central portion 12 such as welding, riveting or the like. Though not illustrated, at least one end section may alternatively be removably affixed to central portion 12 by conventional means (not shown) such as nuts and bolts, threaded collars, or similar, to provide access to the interior of casing 10. A plurality of lower support members 18, affixed to underside of said casing 10, provide means for securing the compressor assembly to any suitable mounting support.

In one embodiment, a linear reciprocating compressor 20, which might be of the type illustrated in U.S. Pat. No. 3,937,600, is contained within said outer casing 10. Said compressor is described generally as having horizontally disposed symmetric compression chambers. A similarly situated symmetric piston has a principal direction of motion along a horizontal axis. The compressor may be driven by alternate linear reciprocating machines including, for example, linear electric motors, Stirling type engines or the like. Although compressor orientation and resultant vibration may be in directions other than the horizontal, the present invention's vibration isolator will be described in terms of motion along a horizontal axis. Motion in directions other than the horizontal is a logical extension of the forthcoming description and operation analysis.

A portion of the suspension system for compressor assembly 20, including linear reciprocating motor 20B, serves simultaneously as a mass flow conduit system in the operation of said assembly. In the embodiment illustrated in FIG. 3 a pair of resilient helical inlet tubes 22 are axially spiraled about the opposite end regions of compressor assembly 20. One end of each helical inlet tube engages the outer casing 10 through connecting means here shown as inlet tube collars 24, 24. Casing 10, here illustrated as at least partially enveloping compressor assembly 20, may equivalently comprise any structural support means for securing the suspension system thereto. Accordingly, casing 10 equivalently comprises any frame support means capable of supporting the linear reciprocating machine relative to ground. The inboard end of each of said helical inlet tubes 22 is rigidly affixed to the inlet port 28 of the compressor by means of an inlet collar 30 which is secured to said compressor assembly by means of a plurality of circumferential welds 32. In the embodiment of FIG. 3, non-rigid vertical suspension is provided by vertical support means 21. Although shown as vertical support cables, 21 may comprise any of a number of alternative support configurations. It should further be recognized that similar to the entire suspension system, herein described as supporting compressor motion essentially along a horizontal axis, an evident modification can be provided for vertical or other orientation of the principal axis of motion for the compressor.

The suspension means further comprises a pair of resilient helical discharge tubes 34, axially spiraled about opposite end regions of compressor assembly 20. One end of each discharge tube is rigidly affixed to the outer casing 10 through collar 36, similar to that described for inlet tubing 22. The inboard end of the tubing is rigidly affixed to a discharge port securing collar 42. In other compressor embodiments, only one of these tubes may be used for discharge flow; the other tube can be used for control pressure purposes or any other mass flow requirement. Furthermore, casing 10 need not enclose the compressor assembly, thereby equivalently comprising any suitable support frame.

In the embodiment of FIG. 3, an essentially solid counterbalance mass 38 of known weight is held in a preselected position on discharge tubes 34, 34 by means of a plurality of screws 40. The use of tightening screws or similar clamping means permits adjustment of the position of the mass along the length of the discharge tube. Although described and illustrated as being prepositioned along the discharge conduit, it should be readily recognized that the counter balance mass may alternatively be positioned along said inlet conduit.

Although not illustrated, the counterbalance mass may alternatively comprise a gas expansion chamber of appropriate mass $M_m$ serving simultaneously as a muffler and counterbalance mass.

Referring now to FIG. 4, from an end view of the compressor system of FIG. 3 it is noted that the helical inlet tubing 22 may spiral from the outer casing 10 to the compressor inlet 28 in a circumferential direction opposite that of the discharge tubing 34. As illustrated in the end view of FIG. 4 the helical inlet tubing 22 spirals in a counterclockwise fashion from the outer casing 10 to the compressor inlet 28. The helical discharge tubing 34 spirals in a clockwise manner from the outer casing 10 to the compressor discharge securing port 42.

Figure 1A:
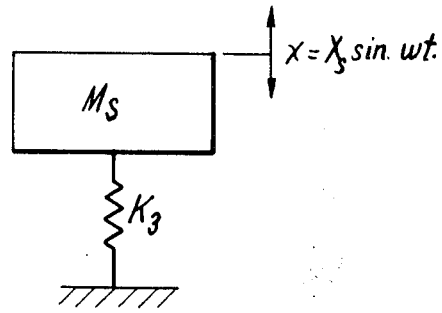
FIGS. 1A and 1B are schematic representations of prior art vibration isolation systems.
Figure 1B:
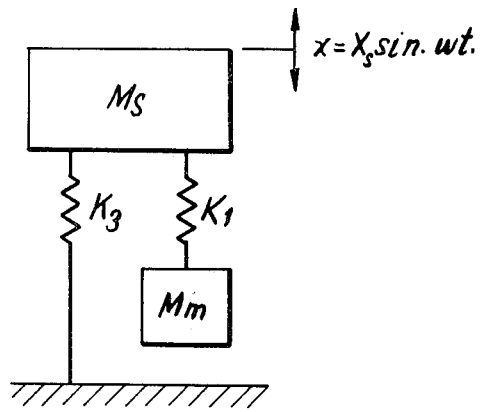
Figure 2:
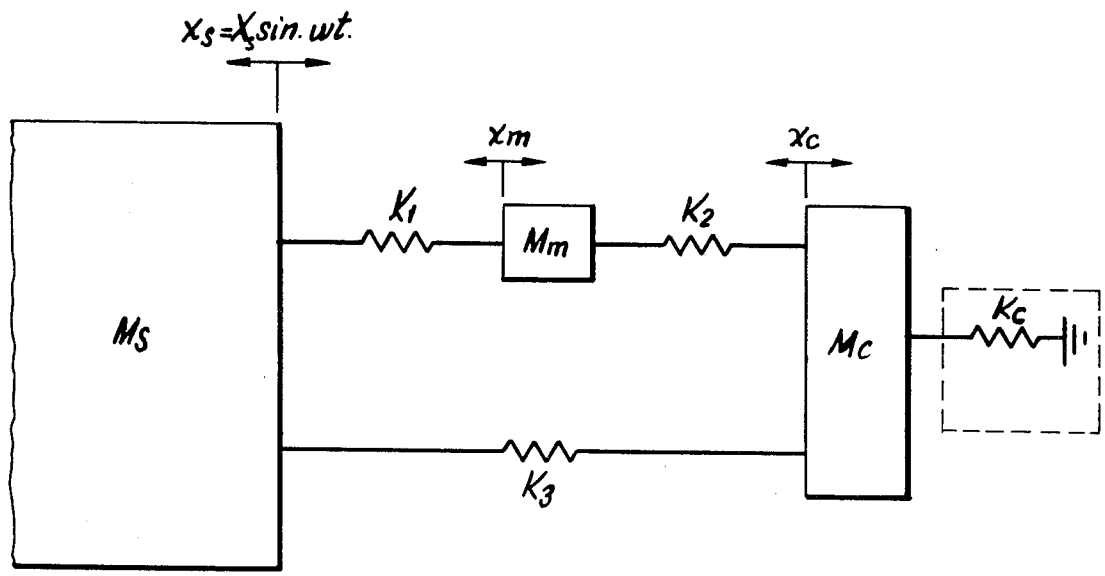
FIG. 2 is a schematic representation of the vibration isolation system of the present invention.

Referring now to the vibration isolation characteristics of the suspension system, FIG. 2 illustrates a mass-elastic schematic representation of the suspension system in accordance with the present invention. The following list of terms, when referenced to the cross-sectional view of FIG. 3 will more clearly define the symbols used in the mass-elastic model represented in FIG. 2:

$K_1$ is equal to the lateral stiffness of that portion of the helical discharge tube(s) 34, 34 extending from a point of rigid attachment to the compressor 42 to a point where the tube engages the counterbalance mass here shown for example as the point 44 where said tube is rigidly clamped within said mass 38.

$K_2$ is equal to the lateral stiffness of that portion of the helical discharge tube(s) 34, 34, extending from a point of rigid attachment to the outer casing 46,46, or equivalently to a supporting frame, to a point where the tube engages the counterbalance mass at 44,44.

$k_3$ is equal to sum of two lateral stiffness components. One component is the lateral stiffness of helical inlet tubes 22, 22 extending from a point of engagement to the outer casing shown at 25,25, to a point where the tube (s) engages collar 30 here shown at 31,31. The second component is the lateral stiffness of the vertical support means 21,21.

$M_c$ is equal to the mass of casing 10, or an equivalent supporting frame $M_s$ is equal to the mass of compressor 20.

$M_m$ is equal to the mass of counterbalance masses 38,38.

$K_c$ is equal to the lateral stiffness of the outer casing's lower support brackets 18;

$x_s$ is the lateral displacement of the mass of compressor assembly 20 from its static equilibrium position;

$x_c$ is the lateral displacement of casing 10 from its static equilibrium position;

$x_m$ is the lateral displacement of the counter balancing mass 38 from its equilibrium position;

w is proportional to the frequency of periodic motion (operating frequency) of the compressor where $w = 2\pi f$, where f is the operating frequency of the compressor.

All values of stiffness K and displacement x are defined along a horizontal axis, that is, in a direction parallel to the horizontal centerline of compressor 20 and casing 10.

Operation of the dynamic vibration isolator entails the antiphase movement of the counterbalance mass $M_m$ relative to the periodic motion $x_s$ of the compressor mass. Motor and gas-pressure forces generated within the compressor cause the compressor mass to vibrate at operating frequency f. Vibration of the compressor mass causes a spring force to be applied through the $K_1$ portion of the discharge tube to the counterbalance mass $M_m$, causing the counterbalance mass to vibrate. This in turn exerts a force through the $K_2$ portion of the discharge tube acting on casing mass $M_c$. Concurrently, vibration of the compressor mass $M_s$ applied through stiffness $K_3$ of the inlet tubes and the vertical support means produces another dynamic force acting on casing mass $M_c$. By proper selection of the values of $K_1$, $K_2$, $K_3$ and $M_m$, the forces acting on the casing mass $M_c$ through elements $K_2$ and $K_3$ can be made equal in magnitude and opposite in phase such that the resultant or vector sum of these two spring forces acting on the casing will be zero at a particular operating frequency of the compressor. At this condition the motion of the counter balance mass $M_m$ will be antiphase to that of the compressor mass $M_s$. The actual values of casing mass $M_c$ and casing support stiffness $K_c$ do not influence the values of $K_1$, $K_2$, $K_3$ of $M_m$ as required to achieve zero force transmission at the specified or desired compressor operating frequency.

For a particular size and length of discharge tubing, the position of mass $M_m$ relative to the ends of the helical discharge tube dictates the stiffness values $K_1$ and $K_2$. A mathematical preselection of the position of $M_m$ can be calculated. In a working reality, however, such calculations may only closely approximate the correct relationships of stator and counterbalance mass antiphase motion, requiring minor repositioning of $M_m$. Therefore, in accordance with one aspect of the present invention, the position of $M_m$ (and therein the values of $K_1$ and $K_2$), are readily adjusted to provide extremely low transmissibility between the compressor and the outer casing.

For one skilled in the art, a more definitive description of the dynamic vibration isolation means of the present invention is provided by the following analysis of the motions and forces involved. To facilitate illustration, the analysis makes reference to the embodiment including a linear reciprocating motor driven compressor.

PRINCIPLES OF OPERATION

The equations of motion for the compressor suspension and fluid flow system are:

$$K_1(x_s - x_m) + K_2(x_c - x_m) = M_m \ddot{x}_m \tag{1}$$

$$K_2(x_m - x_c) + K_3(x_s - x_c) - K_c x_c = M_c \ddot{x}_c \tag{2}$$

Where $\ddot{x}$ denotes linear acceleration $(d^2x)/(dt^2)$

Rearranging and substituting for $x_s$ a periodic function of time, $x_s = X_s \sin wt$; gives $$M_m \ddot{x}_m + x_m(K_1 + K_2) - x_c K_2 = K_1 X_s \sin wt \tag{3}$$

$$M_c \ddot{x}_c + x_c(K_2 + K_3 + K_c) - x_m K_2 = K_3 X_s \sin wt \quad (4)$$

Where w is proportional to the frequency of periodic displacement of the compressor 20, that is, to the operating frequency of the compressor according to the following equation:

$$w = 2\pi f; \quad (5)$$

Assuming particular solutions of the form $$x_m = X_m \sin wt \quad (6)$$

$$x_c = X_c \sin wt \quad (7)$$

and solving the equations of motion for $X_c$ gives:

$$X_c = \frac{X_s(-M_m K_3 w^2 + K_1 K_3 + K_2 K_3 + K_1 K_2)}{M_m M_c w^4 - w^2[M_m(K_2 + K_3 + K_c) + M_c(K_1 + K_2)] + K_1(K_2 + K_3 + K_c) + K_2(K_3 + K_c)} \quad (8)$$

$X_c$ will equal to zero when the numerator quantity $(-M_m K_3 w^2 + K_1 K_3 + K_2 K_3 + K_1 K_2)$ is equal to zero and the denominator, which represents the undamped natural frequency equation for the isolation and suspension system, is other than zero. For given values of the various K's and M's, the denominator will be zero for two values of w, which values correspond to the two natural resonance frequencies of the isolation and suspension system; these values will be denoted $w_{n1}$ and $w_{n2}$. Solving for the condition where the numerator will equal zero, it is found that:

$$K_3 = \frac{-K_1 K_2}{(K_1 + K_2)\left[1 - \left(\frac{w}{w_n}\right)^2\right]} \quad (9)$$

where $$w_n = \sqrt{\frac{K_1 + K_2}{M_m}} \quad (10)$$

therefore $$K_3 = \frac{-K_1 K_2}{(K_1 + K_2)\left(1 - \frac{w^2 M_m}{K_1 + K_2}\right)} \quad (9b)$$

Since, in a physical isolator system, $K_3$ must be a real, positive number (as must $K_1$, $K_2$ and $M_m$ also), Equation 9 dictates that $w_n$ must be less than w. In other words, to obtain zero force transmissibility at a specific compressor operating frequency f, values of $K_1$, $K_2$ and $M_m$ must be selected such that $$w_n < w, \quad (10)$$

where w and $w_n$ are defined by Equations 5 and 10 respectively.

Once this is recognized, the required value of $K_3$ can be calculated from Equation 9. The only other stipulation required to have a theoretically valid isolator zero force transmission at operating frequency f is that $$w \neq w_{n1}, \text{ and} \quad (12)$$

$$w \neq w_{n2} \quad (13)$$

where $w_{n1}$ and $w_{n2}$ correspond to the two undamped natural (resonance) frequencies of the system.

The previous analysis did not account for attendant system damping. From a practical standpoint it is recognized that some damping will be present and that normal manufacturing and assembly tolerances make it improbable that the precise conditions for "zero" dynamic force transmission will be met. Therefore, the following criteria can be used to assure that the actual value of the dynamic force transmitted to the foundation on which the outer casing is mounted will always be small, if not "Zero":

$$w_n < (w)/(2) \quad (14)$$

$$w > 1.5 w_{n2} \quad (15)$$

where $w_{n2}$ by definition is understood to be the greater of the two system natural frequencies $w_{n1}$ and $w_{n2}$.

The two system natural frequencies $w_{n1}$ and $w_{n2}$ can be found from the following equations:

$$w_{n1} = +\sqrt{\lambda_1} \quad (16)$$

$$w_{n2} = +\sqrt{\lambda_2} \quad (17)$$

$$\lambda_1 = \tfrac{1}{2}[b - \sqrt{b^2 - 4c}] \quad (18)$$

$$\lambda_2 = \tfrac{1}{2}[b + \sqrt{b^2 - 4c}] \quad (19)$$

and $$b = \frac{(K_2 + K_3 + K_c)}{M_c} + \frac{(K_1 + K_2)}{M_m} \quad (20)$$

$$c = \frac{K_1(K_2 + K_3 + K_c) + K_2(K_3 + K_c)}{M_c M_m} \quad (21)$$

EXAMPLE 1

Employing the previously described design criteria, a refrigeration compressor (similar to that illustrated in FIG. 3 to which reference will be made) was constructed. An electrodynamic linear motor 20B as described in U.S. Pat. No. 3,891,874 is used to drive a linear reciprocating compressor 20 of the type described in U.S. Pat. No. 3,937,600.

Seamless steel inlet tubing 22 having an outer diameter of ⅜ inch and a wall thickness of 40/1000 inch and a total length each of 35 inches are formed into helices having a mean diameter of 9.5 inches and brazed into inlet collars 30 on the compressor housing. The outer end of the inlet tubing is brazed into a conduit coupling collars 26 affixed to the outer casing 10.

Similarly, seamless steel discharge tubing 34 having an outer diameter of ½ inches are formed into helices and brazed into compressor discharge ports securing collars 42 and outer casing conduit coupling collars 36. A counter balance 38 of known mass is affixed to discharge tubing 34 at 44. Machine screws compress the axial extremity portions of the counterbalance to rigidly engage the tubing. The elastomeric cushioned lower support member 18 were affixed to a mounting foundation threaded to accept a securing bolt.

The intake and outlet conduit were appropriately connected and the compressor was driven at 230 volts and a line frequency of 60 Hz.

Initial vibration experienced at the outer casing was virtually eliminated after minor adjustment of the position of the counterbalance mass. The elastomeric cushioned lower support ($K_c$) was removed and the outer casing allowed to rest, unanchored, on the test bench. The motor was restarted and vibration measurements again indicated essentially no vibration of the outer casing and no dynamic force transmitted to the test bench.

What is claimed is:

1. A vibration isolation system for a machine reciprocating in a "lateral" direction comprising:
   a frame for supporting the machine relative to ground;
   a suspension system, suspending said machine from said frame and including functionally operating components of said machine providing a resilient lateral support means coupled between said frame and the reciprocating machine;
   a counterbalance mass positioned at a predetermined point on one or more selected components of said resilient lateral support means, wherein, in response to forces thereupon resulting from reciprocating movement of the machine, an antiphase movement of the counterbalance mass results in a substantially reduced resultant force exerted upon said frame.

2. The vibration system of claim 1 wherein said resilient lateral support means comprises at least one resilient conduit.

3. The vibration isolation system of claim 1 wherein said resilient lateral support means comprises at least one resilient conduit having the counterbalance mass prepositioned along the length thereof.

4. The vibration isolation system of claim 2 wherein said resilient conduit comprises at least one discharge conduit providing mass flow from said machine.

5. The vibration isolation system of claim 1 wherein said lateral support means comprise at least one helical shaped conduit, at least a portion of which is spiraled about an end region of said machine.

6. The vibration isolation system of claim 5 wherein said helical shaped conduit is spiraled about an axis of the machine's reciprocating motion.

7. The vibration isolation system of claim 1 or 5 wherein said counterbalance mass comprises a muffler.

8. The system of claim 1 wherein said frame includes an outer casing enclosing said reciprocating machine.

9. A vibration isolation means for isolating vibratory displacement and vibratory forces of a reciprocating machine, said isolation means comprising:
   resilient conduit means operatively coupled between said machine and a base, said resilient means providing mass flow with respect to said machine and exerting a restoring force on said machine whenever the machine is displaced from an equilibrium position;
   a counterbalance mass positioned at a predetermined point on at least one of said resilient conduit means where, in response to the vibratory displacement of said machine, an anti-phase movement of the counterbalance mass results in a substantially reduced resultant force exerted upon said frame.

10. The vibration isolation means of claim 9 wherein said conduit means are shaped in the form of helices and where said anti-phase movement of the counterbalance mass is further characterized as displacement of the counterbalance mass from its equilibrium position resulting from a periodic force exerted upon said counterbalance mass through a portion of resilient conduit secured between the counterbalance mass and the reciprocating machine and from a periodic force exerted upon the counterbalance mass and the mounting foundation, said periodic forces resulting from the vibratory motion of said reciprocating machine.

11. The vibration isolation means of claim 10 wherein said conduit means are in the form of helices and are spiraled about opposite ends of said machine.

12. A compressor system of the reciprocating type including vibration isolation means, said system comprising:
   a linear reciprocating compressor;
   means for providing mass flow to said compressor including at least one resilient helical discharge conduit;
   suspension means for non-rigidly supporting said compressor, said means including said conduit spiraled about an end region of said conduit, one end region of each said conduit being rigidly affixed to said compressor, another end region of each said conduit being rigidly affixed to an outer casing, said helical conduit providing mass flow from said compressor and further providing resilient support in a direction substantially coaxial with the compressors' linear reciprocating movement;
   a counterbalance mass positioned at a predetermined point on at least one conduit, where, in response to forces thereupon resulting from reciprocating movement of the compressor, an anti-phase movement of the counterbalance mass results in a substantially reduced resultant force exerted upon said casing.

13. The compressor system of claim 12 wherein said suspension means further includes vertical support means for suspending said compressor from said outer casing to provide non-rigid resilient vertical support for said compressor.

14. The compressor system of claim 13 wherein said vertical suspension means comprise at least one cable coupled to said outer casing and vertically supporting said compressor.

15. A mass-elastic vibration isolation system for reducing the resultant dynamic force transmitted to a supporting frame by a reciprocating body, comprising:
   a second body having a mass $M_m$;
   a spring element connected between said bodies and having a spring constant $K_1$ in a direction of reciprocation of said reciprocating body;

a second spring element connected between said second mass and said frame and having a spring constant $K_2$ in the direction of reciprocation of said reciprocating body;

a third spring connected between said reciprocating body and said frame and having a spring constant $K_3$ in the direction of reciprocation of said reciprocating body;

$$\text{wherein } K_3 = \frac{-K_1 K_2}{(K_1 + K_2)\left(1 - \frac{w^2 M_m}{K_1 + K_2}\right)}$$

where w is the operating frequency of said reciprocating body and is greater than the natural frequency of the assembly consisting of said first and second spring elements and the interconnected second body.

16. A vibration isolation and suspension system incorporated into a mass flow system of a linear reciprocating machine comprising:

a frame for supporting the machine relative to ground;

support means for simultaneously suspending said machine from said frame and providing mass flow to and from said suspended machine, said support means comprising at least one resilient inlet and discharge conduit, each conduit having a first end engaging said machine and a second end engaging said frame;

a counterbalance mass positioned at a predetermined point along at least one of said conduits wherein vibratory motion resulting from forces generated by said reciprocating machine is isolated from said frame.

* * * * *